US012633678B2

(12) United States Patent
Bai et al.

(10) Patent No.: US 12,633,678 B2
(45) Date of Patent: May 19, 2026

(54) MAGNETO-ELECTRIC DIPOLE ANTENNA ARRAY

(71) Applicant: Alpha Networks Inc., Hsinchu (TW)

(72) Inventors: Ta-Chuan Bai, Hsinchu (TW); Ding-Bing Lin, Hsinchu (TW); Sung-Nien Hsieh, Hsinchu (TW); Ming-Chieh Hsu, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 64 days.

(21) Appl. No.: 18/969,083

(22) Filed: Dec. 4, 2024

(65) Prior Publication Data

US 2026/0094977 A1 Apr. 2, 2026

(30) Foreign Application Priority Data

Sep. 30, 2024 (TW) ................................ 113137313

(51) Int. Cl.
*H01Q 21/24* (2006.01)
*H01Q 9/04* (2006.01)
*H01Q 9/16* (2006.01)

(52) U.S. Cl.
CPC ........... *H01Q 21/24* (2013.01); *H01Q 9/0414* (2013.01); *H01Q 9/16* (2013.01)

(58) Field of Classification Search
CPC ......... H01Q 21/24; H01Q 9/0414; H01Q 9/16
See application file for complete search history.

(56) References Cited

U.S. PATENT DOCUMENTS

2023/0070175 A1* 3/2023 Moallem .............. H01Q 9/0407

FOREIGN PATENT DOCUMENTS

CN 113937482 A * 1/2022 ............. H01Q 1/242
CN 114614273 A 6/2022
CN 117810678 A * 4/2024 ............... H01Q 1/48

* cited by examiner

*Primary Examiner* — Hoang V Nguyen
(74) *Attorney, Agent, or Firm* — HSML P.C.

(57) ABSTRACT

A magneto-electric dipole antenna array includes a substrate and at least one antenna unit. Each of the at least one antenna unit includes an electric-dipole component, a magnetic-dipole component, a first feeding probe, a second feeding probe and a stripline. The electric-dipole component is disposed on an upper surface of the substrate. The magnetic-dipole component is disposed in the substrate and between the upper surface and a lower surface of the substrate, and is electrically connected to the electric-dipole component. The first feeding probe is disposed on the upper surface of the substrate for vertical polarization. The second feeding probe is disposed in the substrate and between the upper surface and the lower surface of the substrate for horizontal polarization. The stripline is disposed in the substrate and between the first feeding probe and the second feeding probe for capacitive coupling.

15 Claims, 11 Drawing Sheets

MAGNETO-ELECTRIC DIPOLE ANTENNA ARRAY

CROSS-REFERENCE TO RELATED APPLICATION

This application claims priority to Taiwanese Invention Patent Application No. 113137313, filed on Sep. 30, 2024, the entire disclosure of which is incorporated by reference herein.

FIELD

The disclosure relates to a magneto-electric dipole antenna array, and more particularly to a magneto-electric dipole antenna array that includes a stripline for capacitive coupling.

BACKGROUND

Referring to FIG. 1, a single-layer magneto-electric dipole array antenna disclosed in Chinese Patent Application Publication No. CN114614273A includes four magneto-electric dipole units 81, 82, 83, 84 that form a 2×2 array. Any two adjacent ones of the magneto-electric dipole units 81, 82, 83, 84 are connected by microstrip lines 7. Each of the magneto-electric dipole units 81, 82, 83, 84 is provided with a feed-in port 91/92/93/94, and includes a dielectric substrate, four square dipoles, a cross-shaped magneto-electric dipole and a coaxial probe. With respect to each of the magneto-electric dipole units 81, 82, 83, 84: the square dipoles are disposed on an upper surface of the dielectric substrate, are arranged in a 2×2 array, and are each provided with a row of holes in each of an X direction and a Y direction; the magneto-electric dipole is disposed on the upper surface of the dielectric substrate, and is surrounded by the square dipoles; and the coaxial probe extends downwardly from one end of the magneto-electric dipole (which acts as the feed-in port 91/92/93/94 of the magneto-electric dipole unit 81/82/83/84) into the dielectric substrate.

SUMMARY

Therefore, an object of the disclosure is to provide a magneto-electric dipole antenna array.

According to the disclosure, the magneto-electric dipole antenna array includes a substrate and at least one antenna unit. The substrate has an upper surface and a lower surface that are opposite to each other. Each of the at least one antenna unit includes an electric-dipole component, a magnetic-dipole component, a first feeding probe, a second feeding probe and a stripline. The electric-dipole component is disposed on the upper surface of the substrate. The magnetic-dipole component is disposed in the substrate between the upper surface and the lower surface of the substrate, and is electrically connected to the electric-dipole component. The first feeding probe is disposed on the upper surface of the substrate for vertical polarization. The second feeding probe is disposed in the substrate and between the upper surface and the lower surface of the substrate for horizontal polarization. The stripline is disposed in the substrate and between the first feeding probe and the second feeding probe for capacitive coupling.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
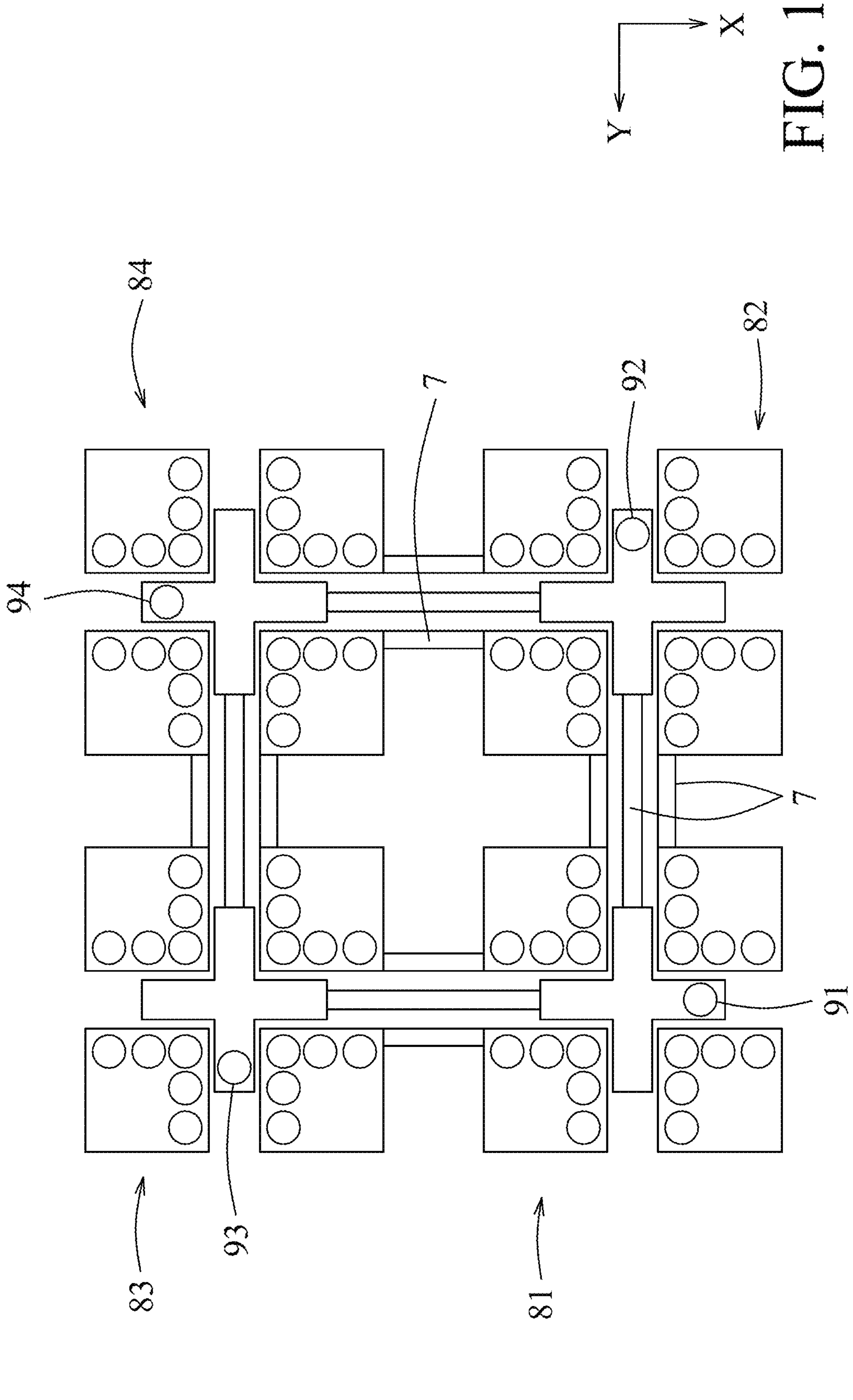
FIG. 1 PRIOR ART
FIG. 1 is a top view of a conventional single-layer magneto-electric dipole array antenna.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 2 to 5, an embodiment of a magneto-electric dipole antenna array according to the disclosure is configured to operate in a frequency range around and covering a target frequency. The frequency range is also referred to as an operating frequency band, and may be, for example, from about 17.7 GHz to about 20.2 GHz. The target frequency is, for example, a center frequency of the frequency range (i.e., about 19 GHZ).

The magneto-electric dipole antenna array of this embodiment includes a substrate 1 and a plurality of antenna units 2. The antenna units 2 are arranged in an antenna unit array, so as to enhance a gain of the magneto-electric dipole antenna array of this embodiment. Specifically, the antenna unit array has a number (M) of columns and a number (N) of rows (i.e., the magneto-electric dipole antenna array of this embodiment includes a number (M×N) of antenna units 2), where each of M and N is a positive integer. In this embodiment, M=2 and N=2. However, the disclosure is not limited to such a configuration. A distance between two geometric centers of any two adjacent ones of the antenna units 2 is substantially equal to half of the wavelength of the target frequency. As such, according to the antenna array theory, a radiation pattern of the magneto-electric dipole antenna array of this embodiment can have a minimum side lobe, and it can be determined from a main lobe of the radiation pattern that the magneto-electric dipole antenna array of this embodiment can have relatively good directivity.

The substrate 1 has an upper surface 11 and a lower surface 12 that are opposite to each other.

Each of the antenna units 2 includes an electric-dipole component 21, a magnetic-dipole component 22, a first feeding probe 231, a second feeding probe 241, a first feed-in line 232, a second feed-in line 242, a first conductive interconnect 233, a second conductive interconnect 243, a stripline 25 and a ground layer 26.

With respect to each of the antenna units 2, the ground layer 26 is disposed in the substrate 1 and between the upper surface 11 and the lower surface 12 of the substrate 1. The electric-dipole component 21 is disposed on the upper surface 11 of the substrate 1. The magnetic-dipole component 22 is disposed in the substrate 1 and between the upper surface 11 and the lower surface 12 of the substrate 1, and is electrically connected to the electric-dipole component 21. The first feeding probe 231 is disposed on the upper surface 11 of the substrate 1. The first feed-in line 232 is disposed on the lower surface 12 of the substrate 1. The first conductive interconnect 233 is disposed in the substrate 1 and between the upper surface 11 and the lower surface 12 of the substrate 1, and is electrically connected to the first feeding probe 231 and the first feed-in line 232. The second feeding probe 241 is disposed in the substrate 1 and between the upper surface 11 and the lower surface 12 of the substrate 1. The second feed-in line 242 is disposed on the lower surface 12 of the substrate 1. The second conductive interconnect 243 is disposed in the substrate 1 and between the upper surface 11 and the lower surface 12 of the substrate 1, and is electrically connected to the second feeding probe 241 and the second feed-in line 242. In this embodiment, the first feeding probe 231 is used for vertical polarization, and the second feeding probe 231 is used for horizontal polarization, so the magneto-electric dipole antenna array of this embodiment can have circular polarization effect. In this embodiment, each of the first feed-in line 232 and the second feed-in line 242 is a microstrip line. However, the disclosure is not limited to such configuration. The stripline 25 is disposed in the substrate 1 and between the first feeding probe 231 and the second feeding probe 241 for capacitive coupling.

Figure 2:
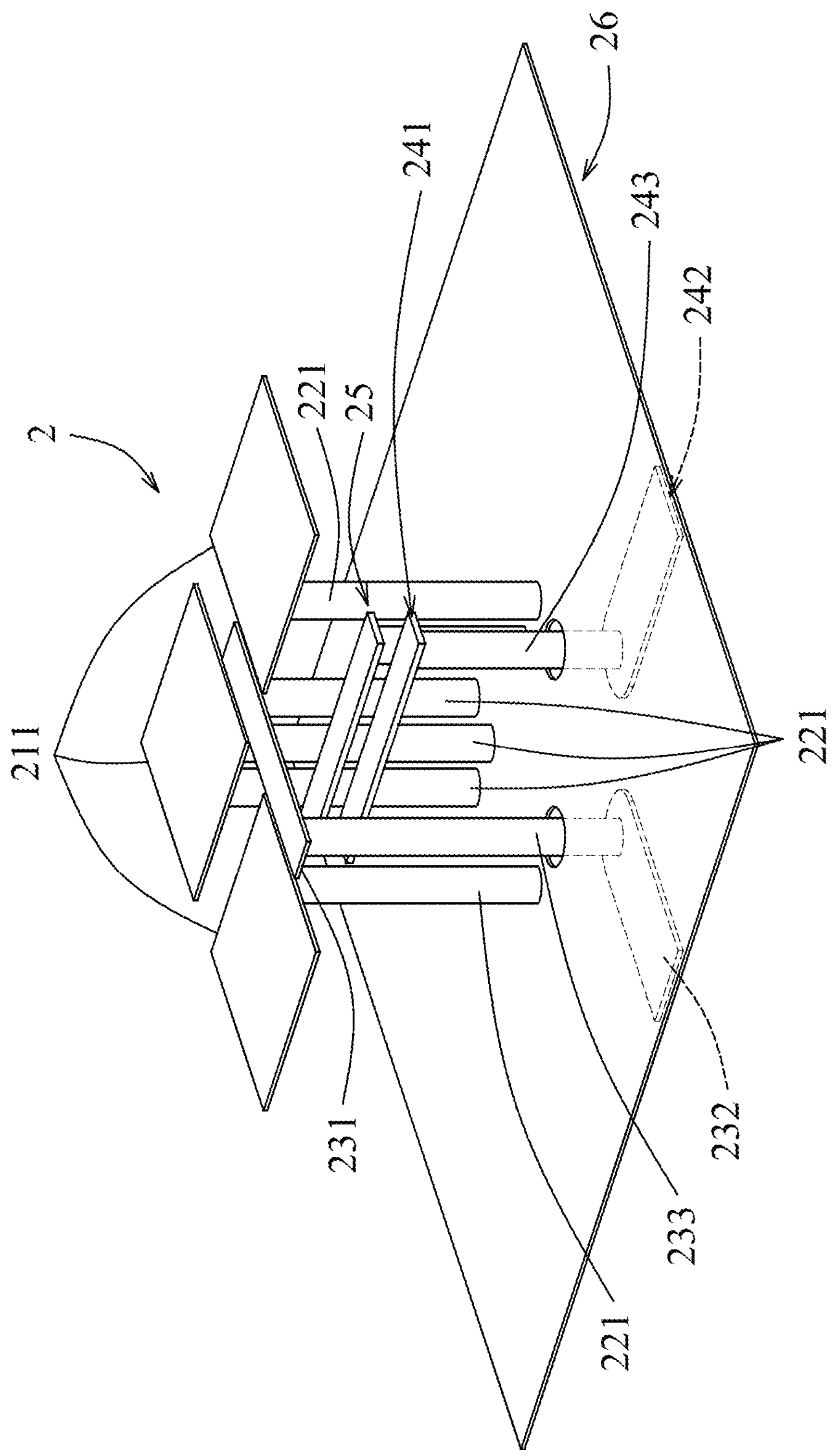
FIG. 2 is a fragmentary perspective view of an antenna unit of an embodiment of a magneto-electric dipole antenna array according to the disclosure.
Figure 3:
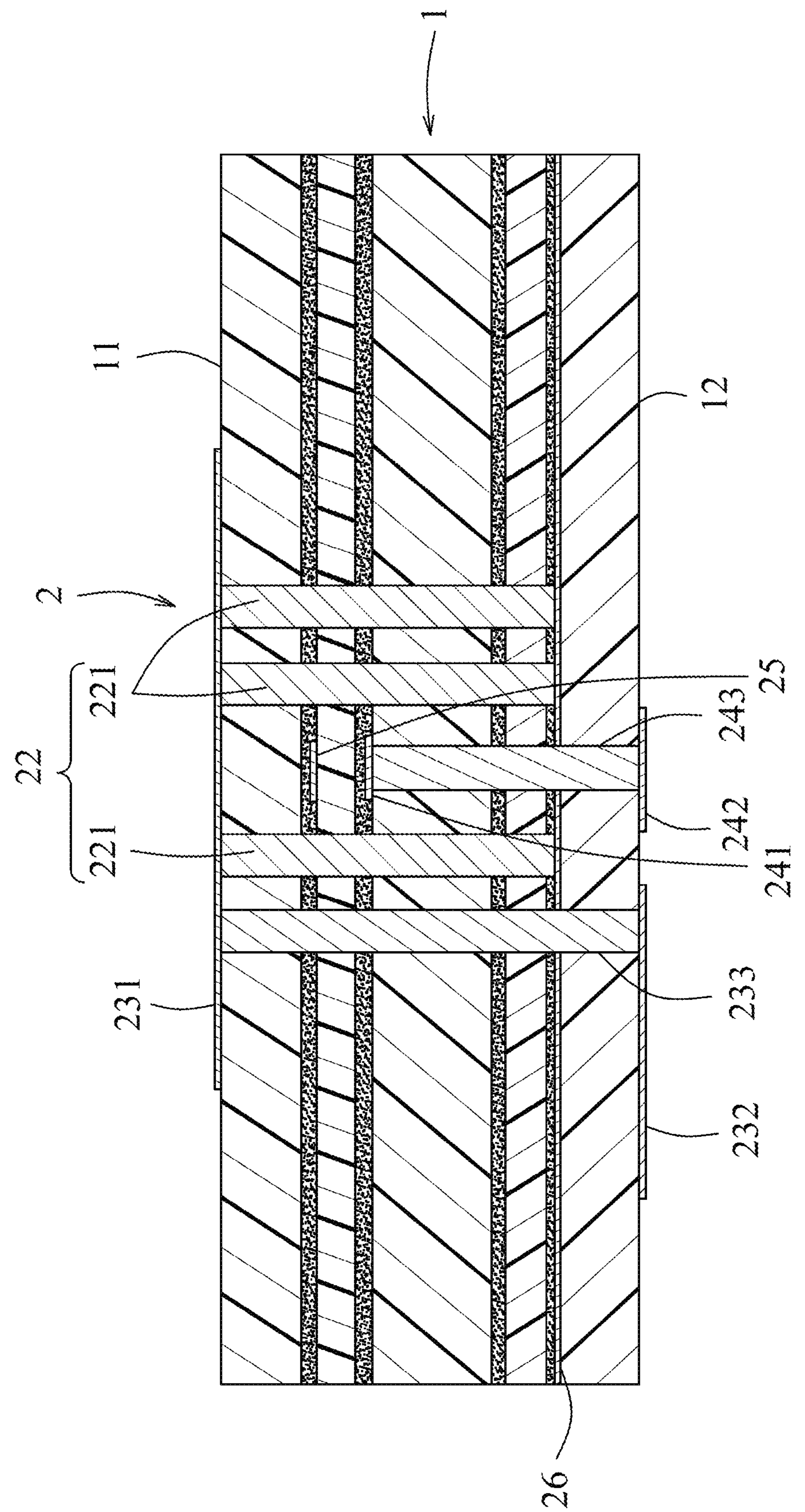
FIG. 3 is a schematic diagram illustrating relative positions of various components of the antenna unit of the embodiment in a direction pointing from bottom to top of the embodiment.

Specifically, with respect to each of the antenna units 2, the electric-dipole component 21 includes four conductive rectangular patches 211. It should be noted that only three of the conductive rectangular patches 211 are depicted in FIG. 2. The conductive rectangular patches 211 are divided into a first patch pair and a second patch pair. The conductive rectangular patches 211 of the first patch pair are aligned in a first direction that is parallel to the upper surface 11 of the substrate 1, and are spaced apart from each other. The conductive rectangular patches 211 of the second patch pair are aligned in the first direction, and are spaced apart from each other. The first patch pair and the second patch pair are spaced apart from each other in a second direction that is parallel to the upper surface 11 of the substrate 1 and that is perpendicular to the first direction. That is, the conductive rectangular patches 211 are spaced apart from one another, and are arranged in a 2×2 array. It should be noted that the first direction and the second direction are only used as reference directions of the antenna unit 2, and the first direction of the antenna unit 2 is perpendicular to the first direction of another one of the antenna units 2 that is adjacent to the antenna unit 2. The magnetic-dipole component 22 includes four via sets that respectively correspond to the conductive rectangular patches 211. It should be noted that only three of the via sets are entirely or partially depicted in FIG. 2. In this embodiment, each of the via sets includes three conductive vias 221 that are perpendicular to the conductive rectangular patch 211 corresponding to the via set, and that extend away from the upper surface 11 of the substrate 1. It should be noted that a total number of the conductive vias 221 of each of the via sets is not limited to three, and may be one, two, four or more in other embodiments. The conductive vias 221 of each of the via sets are electrically connected between the conductive rectangular patch 211 corresponding to the via set and the ground layer 26, and are disposed at one of four corners of the conductive rectangular patch 211 corresponding to the via set, where said one of the corners of the conductive rectangular patch 211 corresponding to the via set is closest to a geometric center of the conductive rectangular patches 211 among the corners of the conductive rectangular patch 211 corresponding to the via set.

Figure 4:
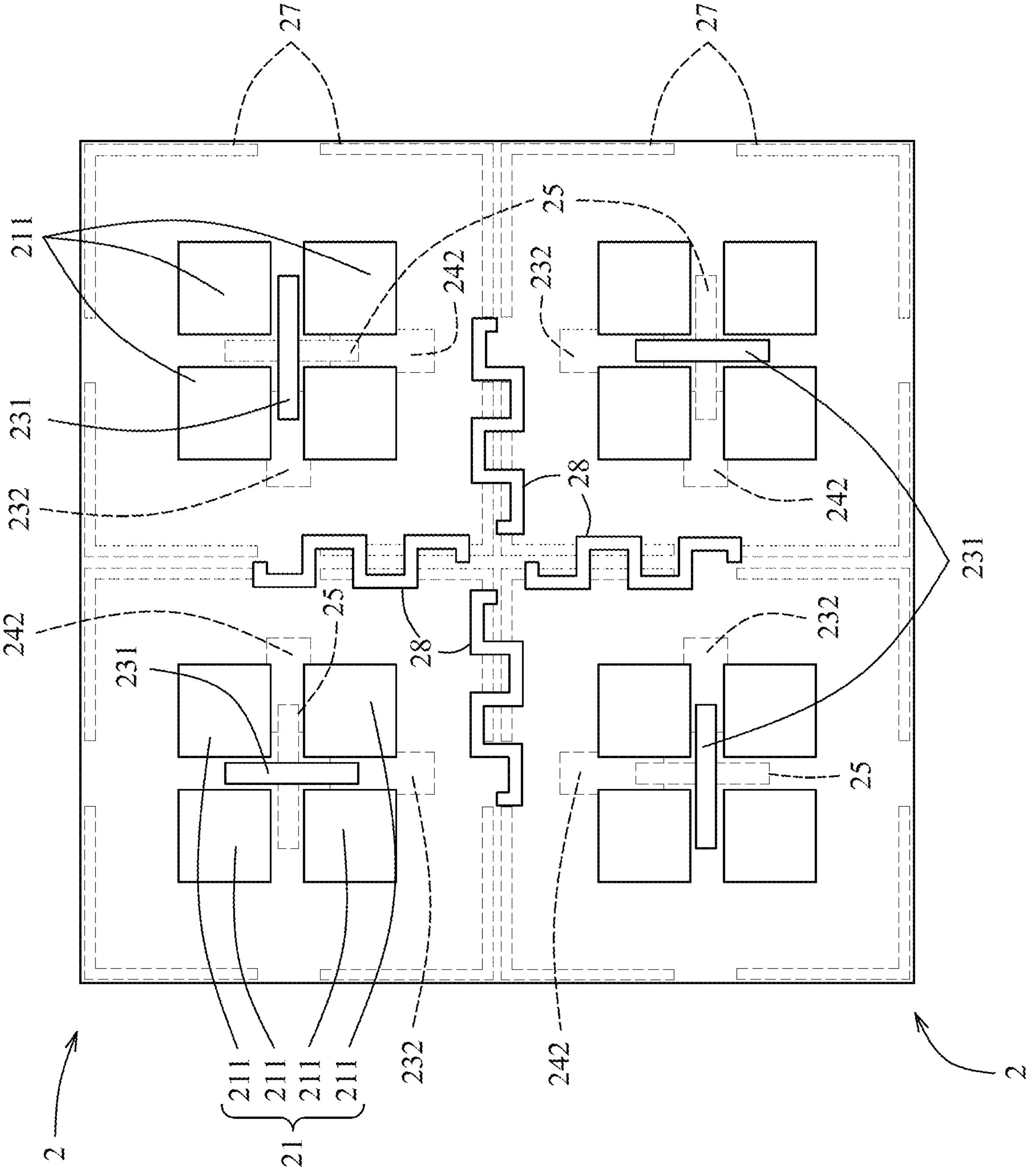
FIG. 4 is a top view of the embodiment.
Figure 5:
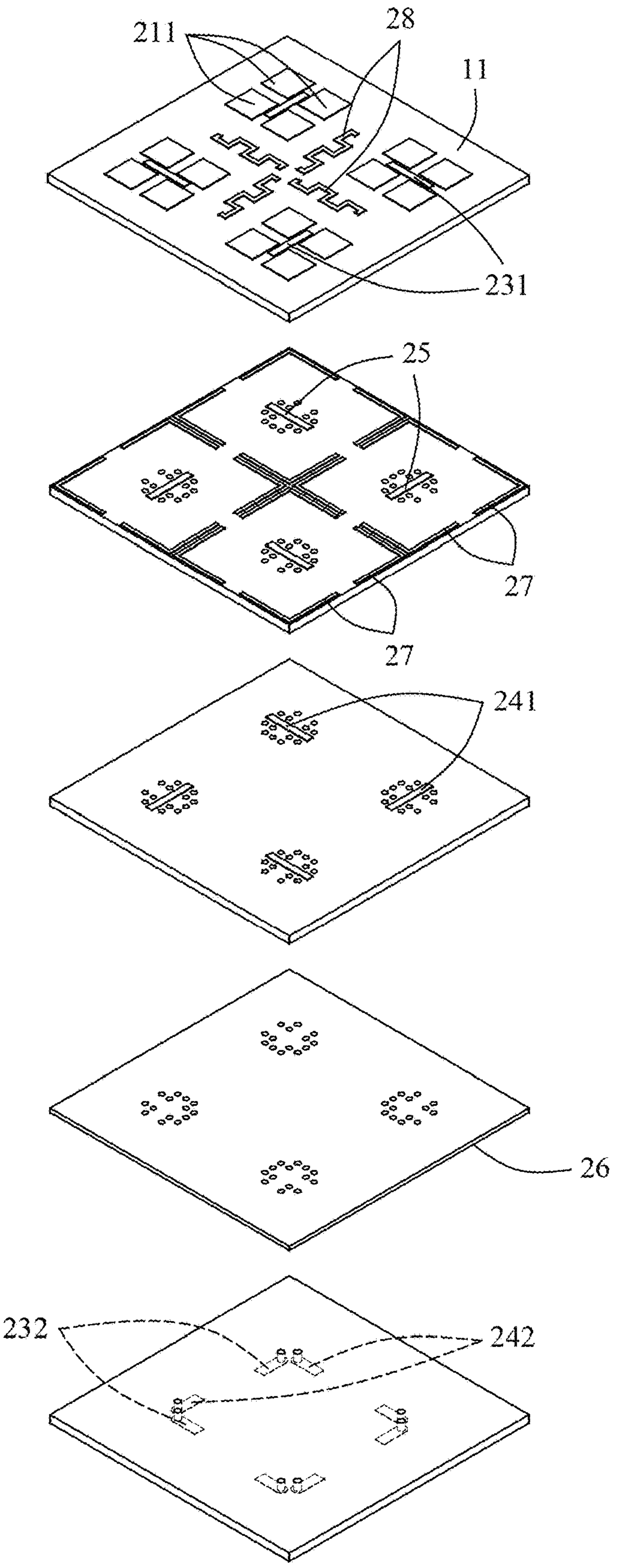
FIG. 5 is an exploded perspective view of the embodiment.

With respect to each of the antenna units 2, the first feeding probe 231 is disposed between the first patch pair and the second patch pair, and extends along the first direction. The second feeding probe 241 is disposed between the upper surface 11 of the substrate 1 and the ground layer 26. A geometric center of the first feeding probe 231, a geometric center of the stripline 25, a geometric center of the second feeding probe 241 and the geometric center of the conductive rectangular patches 211 are aligned in a hypothetical line (not shown) that is perpendicular to the upper surface 11 of the substrate 1. A projection of the stripline 25 on the upper surface 11 of the substrate 1 is perpendicular to the first feeding probe 231. A projection of the second feeding probe 241 on the upper surface 11 of the substrate 1 is perpendicular to the first feeding probe 231. The projection of the stripline 25 on the upper surface 11 of the substrate 1 and the projection of the second feeding probe 241 on the upper surface 11 of the substrate 1 overlap each other. As shown in FIG. 4, any two adjacent ones of the antenna units 2 are offset from each other in orientation by 90 degrees. That is, with respect to any two adjacent ones of the antenna units 2, the first feeding probe 231 of one of the two adjacent antenna units 2 is perpendicular to the first feeding probe 231 of the other one of the two adjacent antenna units 2. In should be noted that, with respect to each of the antenna units 2, the first feeding probe 231, the second feeding probe 241 and the stripline 25 may have different shapes and different dimensions, not limited to what are depicted in FIGS. 2 to 5.

In order to suppress mutual coupling effect among the antenna units 2 and to enhance the gain of the magneto-electric dipole antenna array of this embodiment, each of the antenna units 2 further includes four L-shaped parasitic resonators 27. With respect to each of the antenna units 2, the L-shaped parasitic resonators 27 are disposed in the substrate 1 between the upper surface 11 and the lower surface 12 of the substrate 1, are coplanar with the stripline 25, and enclose the stripline 25. Moreover, the magneto-electric dipole antenna array of this embodiment further includes a plurality of meandering parasitic resonators 28 that are disposed on the upper surface 11 of the substrate 1. With respect to any two adjacent ones of the antenna units 2, one of the meandering parasitic resonators 28 is disposed between the two adjacent antenna units 2.

Referring to FIGS. 2 to 5 and Table 1, the magneto-electric dipole antenna array of this embodiment includes an M1 layer, an H1 layer, a PP1 layer, an M2 layer, an H2 layer, a PP2 layer, an M3 layer, an H3 layer, a PP3 layer, an H4 layer, a PP4 layer, an M4 layer, an H5 layer and an M5 layer that are stacked from top to bottom in the given order. Table 1 lists a material, a thickness and a dielectric constant (Dk) of each of the layers of the magneto-electric dipole antenna of this embodiment. It should be noted that the material "NP-536HC" of the H1 layer, the H2 layer, the H3 layer, the H4 layer and the H5 layer is a dielectric material suitable for forming the substrate 1, and the material "NP-535B" of the PP1 layer, the PP2 layer, the PP3 layer and the PP4 layer is an adhesive material suitable for adhering the H1 layer, the H2 layer, the H3 layer, the H4 layer and the H5 layer together. The conductive rectangular patches 211 and the first feeding probes 231 of the antenna units 2 and the meandering parasitic resonators 28 are formed in the M1 layer. The striplines 25 and the L-shaped parasitic resonators 27 of the antenna units 2 are formed in the M2 layer. The second feeding probes 241 of the antenna units 2 are formed in the M3 layer. The ground layers 26 of the antenna units 2 are formed in the M4 layer. The first feed-in lines 232 and the second feed-in lines 242 of the antenna units 2 are formed in the M5 layer.

TABLE 1

| Name | Material | Thickness (mil) | Dk |
|---|---|---|---|
| M1 | Copper | 1.38 (35 μm) | |
| H1 | NP-536HC | 20 | 3.66 |
| PP1 | NP-535B | 3.94 (100 μm) | 3.5 |
| M2 | Copper | 1.38 (35 μm) | |
| H2 | NP-536HC | 10 | 3.66 |
| PP2 | NP-535B | 3.94 (100 μm) | 3.5 |
| M3 | Copper | 1.38 (35 μm) | |
| H3 | NP-536HC | 30 | 3.66 |
| PP3 | NP-535B | 3.94 (100 μm) | 3.5 |
| H4 | NP-536HC | 10 | 3.66 |
| PP4 | NP-535B | 3.94 (100 μm) | 3.5 |
| M4 | Copper | 1.38 (35 μm) | |
| H5 | NP-536HC | 20 | 3.66 |
| M5 | Copper | 1.38 (35 μm) | |

Figure 6:
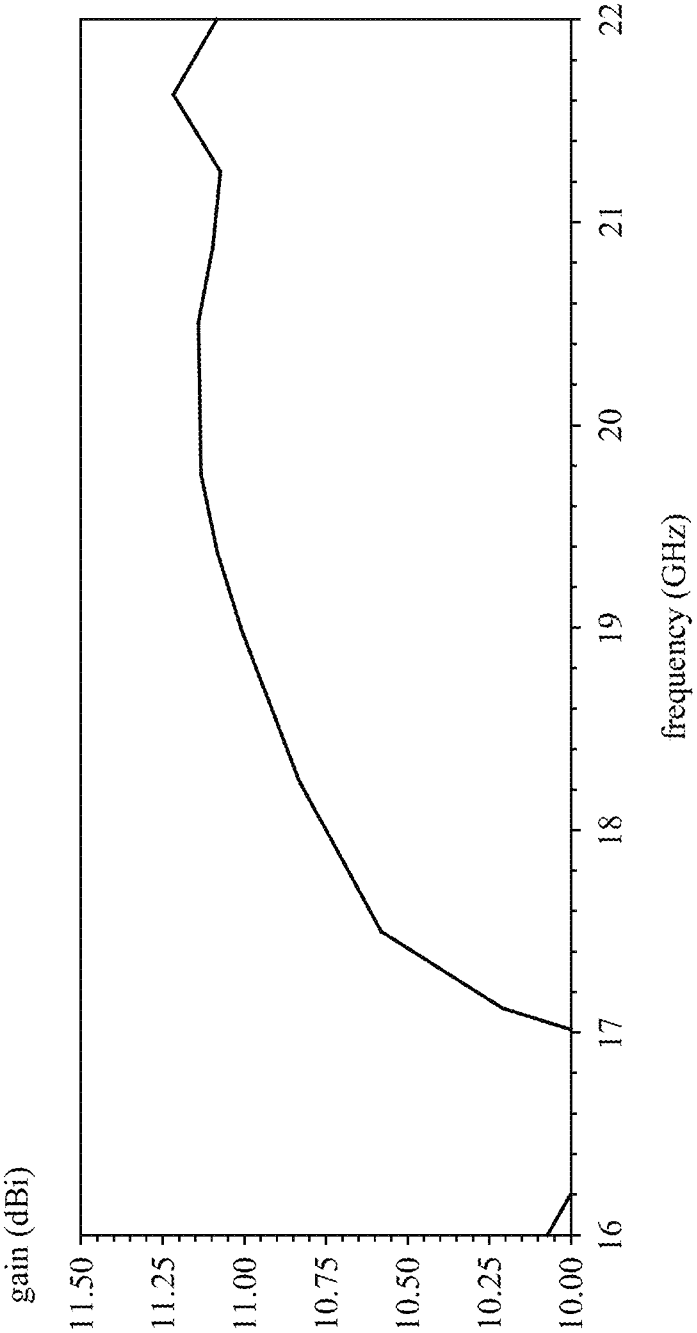
FIG. 6 is a plot illustrating a simulated gain of the embodiment.

FIG. 6 is a plot illustrating a simulated gain of the magneto-electric dipole antenna array of this embodiment in a frequency range of from 16 GHz to 22 GHz. As shown in FIG. 6, the gain of the magneto-electric dipole antenna array of this embodiment falls within a range of from about 10.6 dBi to about 11.1 dBi in the operating frequency band (i.e., from about 17.7 GHZ to about 20.2 GHZ) of the magneto-electric dipole antenna array of this embodiment.

Figure 7:
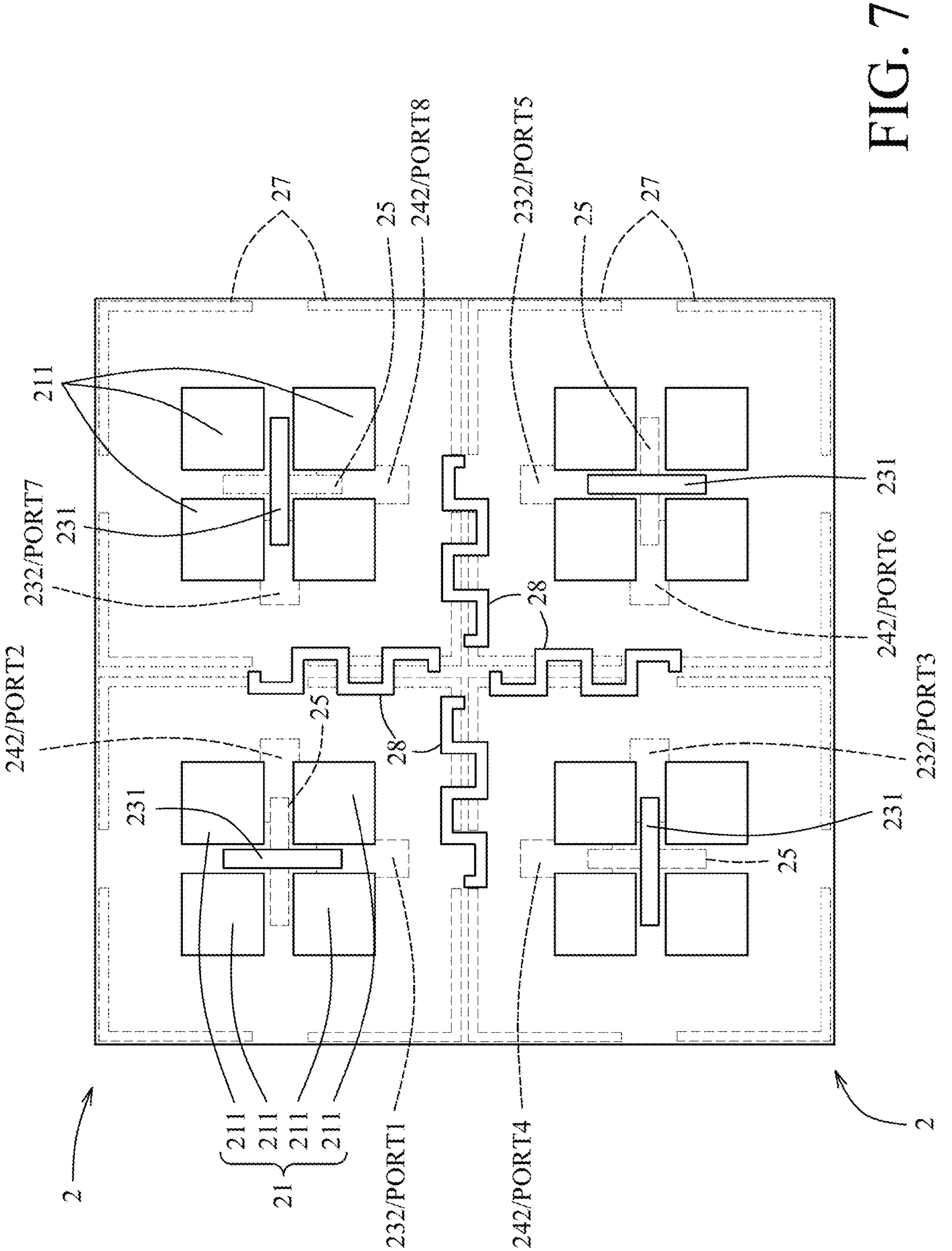
FIG. 7 is a schematic diagram illustrating various ports of the embodiment.
Figure 8:
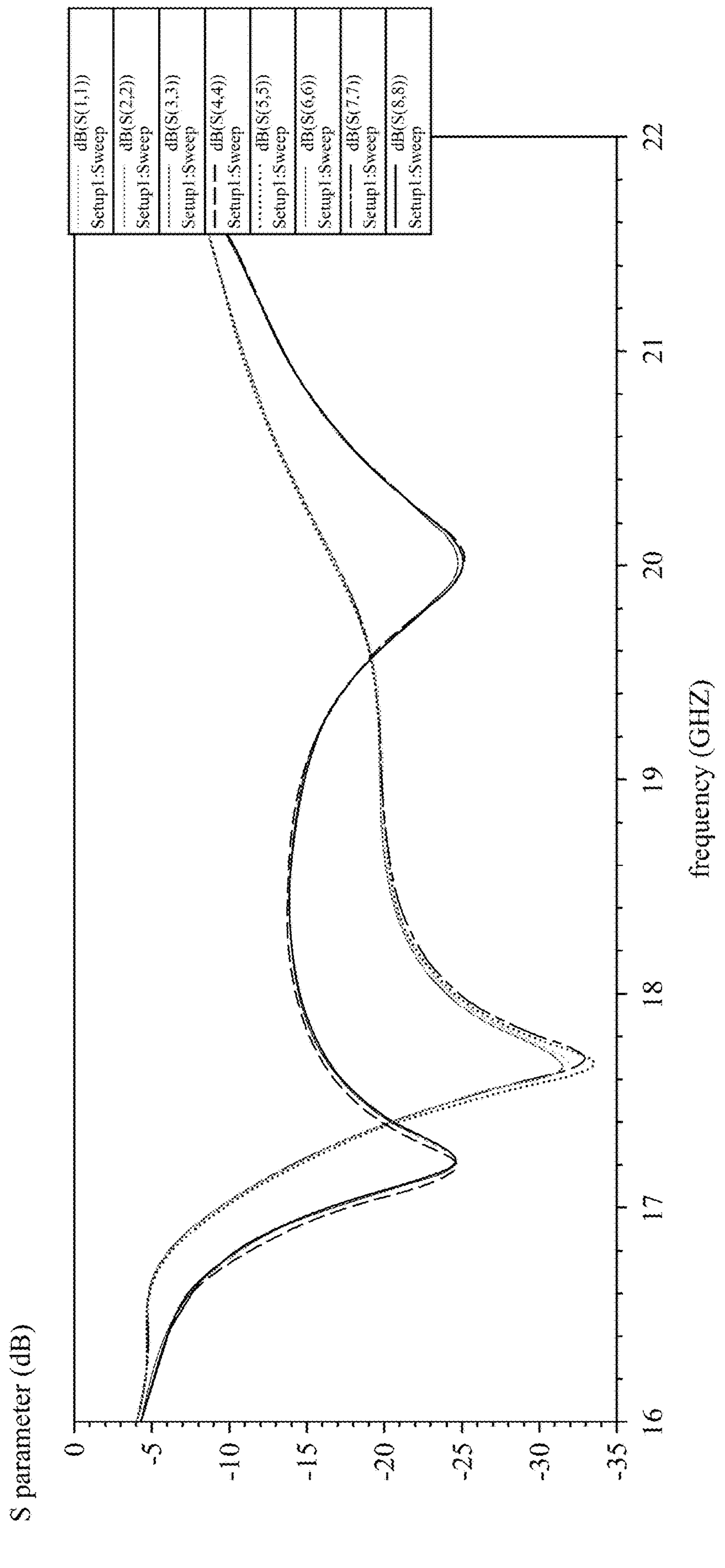
FIGS. 8 to 10 are plots illustrating various simulated scattering parameters of the embodiment.
Figure 9:
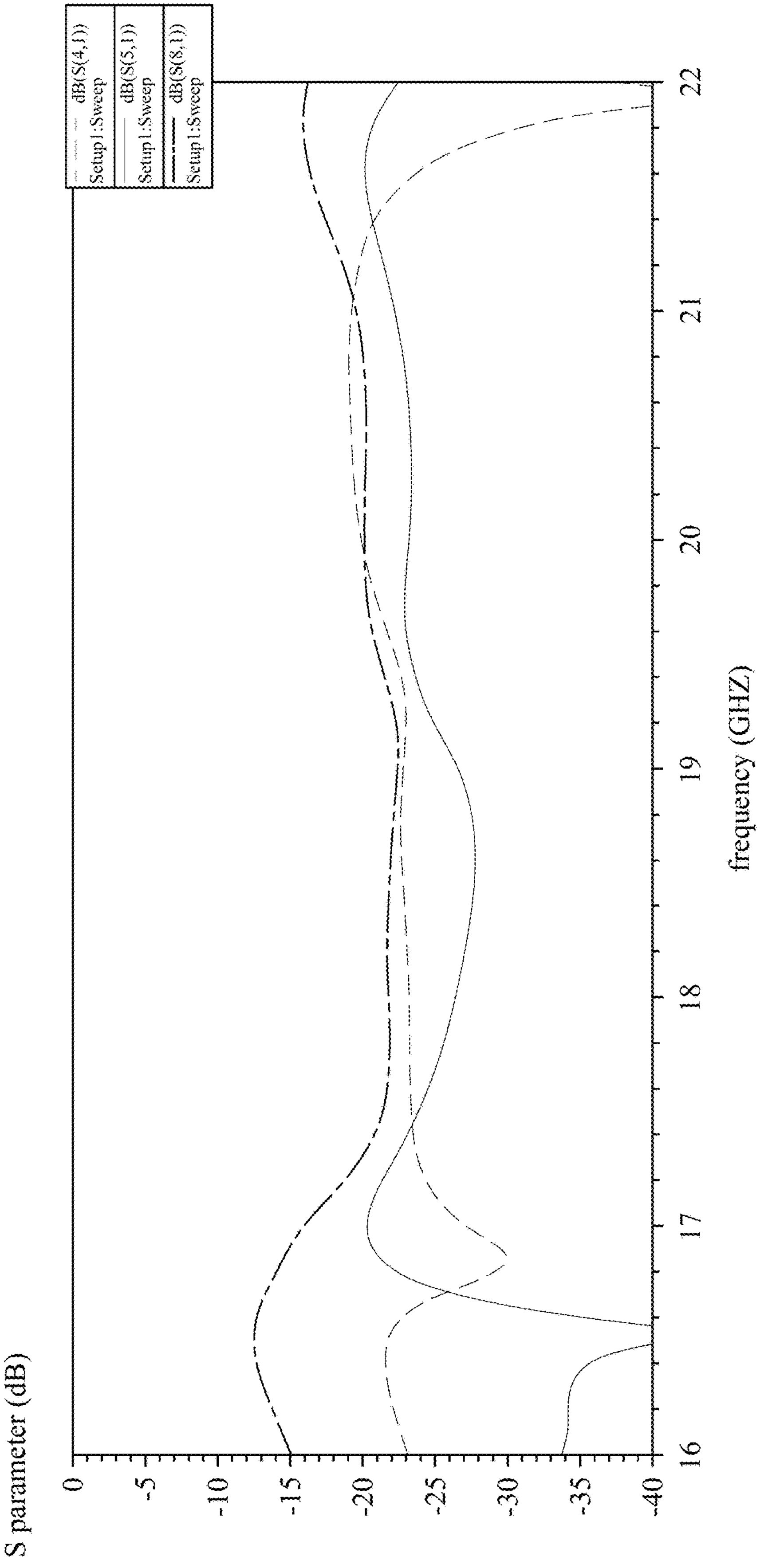
Figure 10:
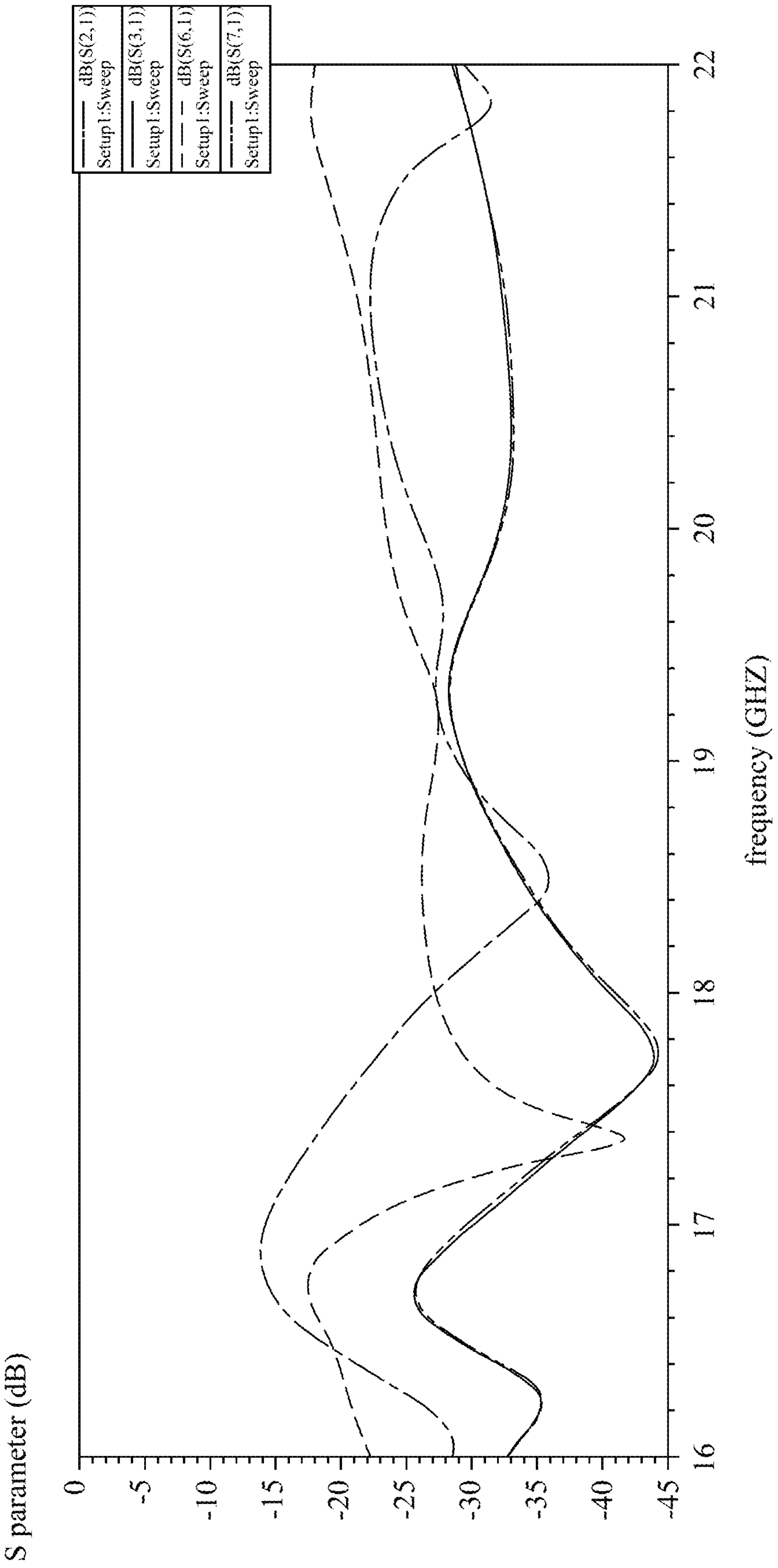

Referring to FIGS. 7 to 10, in order to facilitate description of this embodiment, as shown in FIG. 7, the first feed-in line 232 and the second feed-in line 242 of a first one of the antenna units 2, the first feed-in line 232 and the second feed-in line 242 of a second one of the antenna units 2, the first feed-in line 232 and the second feed-in line 242 of a third one of the antenna units 2, and the first feed-in line 232 and the second feed-in line 242 of a fourth one of the antenna units 2 are respectively referred to as a first port (PORT1), a second port (PORT2), a third port (PORT3), a fourth port (PORT4), a fifth port (PORT5) a sixth port (PORT6), a seventh port (PORT7) and an eighth port (PORT8). FIGS. 8 to 10 are plots illustrating various simulated scattering parameters (S parameters) of the magneto-electric dipole antenna array of this embodiment in a frequency range of from 16 GHz to 22 GHz, where the scattering parameter (S(i,j)) is obtained when the $i^{th}$ port (PORTi) is taken as an output port and the $j^{th}$ port (PORTj) is taken as an input port, where $1 \le i \le 8$ and $1 \le j \le 8$. The scattering parameters (S(1,1), S(2,2), S(3,3), S(4,4), S(5,5), S(6,6), S(7,7), S(8,8) depicted in FIG. 8 are reflection coefficients. The scattering parameters (S(4,1), S(5,1), S(8,1)) depicted in FIG. 9 are transmission coefficients under the same polarization condition. The scattering parameters (S(2,1), S(3,1), S(6,1), S(7,1)) depicted in FIG. 10 are transmission coefficients under different polarization conditions. As shown in FIG. 8, each of the scattering parameters (S(1,1), S(2,2), S(3,3), S(4,4), S(5,5), S(6,6), S(7,7), S(8,8)) is smaller than-10 dB in the operating frequency band of the magneto-electric dipole antenna array of this embodiment. As shown in FIG. 9, each of the scattering parameters (S(4,1), S(5,1), S(8,1)) is smaller than-15 dB in the operating frequency band of the magneto-electric dipole antenna array of this embodiment. As shown in FIG. 10, each of the scattering parameters (S(2,1), S(3,1), S(6,1), S(7,1)) is smaller than-20 dB in the operating frequency band of the magneto-electric dipole antenna array of this embodiment. It can be reasonably determined from FIGS. 9 and 10 that the mutual coupling effect among the antenna units 2 can be effectively suppressed.

Figure 11:
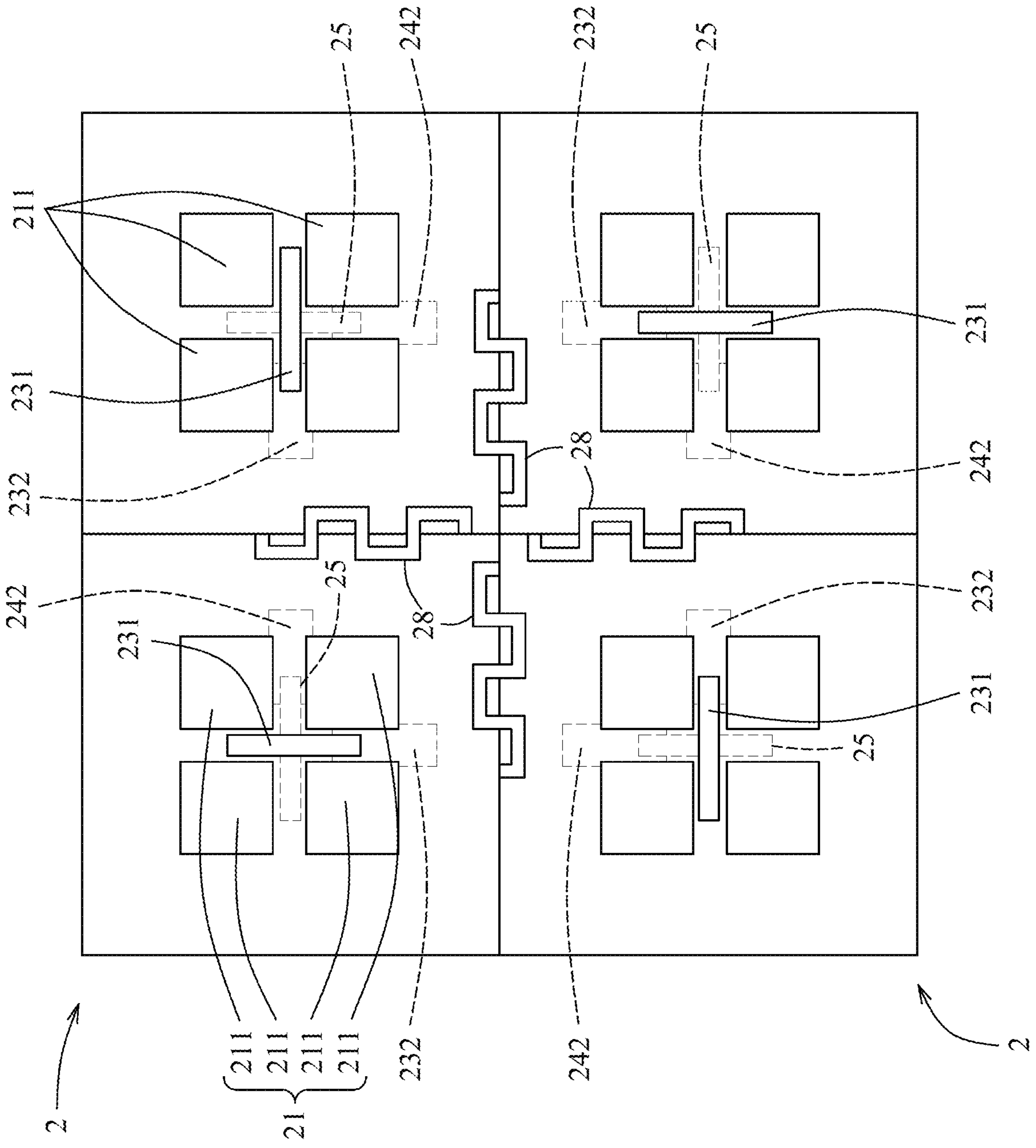
FIG. 11 is a top view of a modification of the embodiment.

It should be noted that, in some other embodiments, the L-shaped parasitic resonators 27 of the antenna units 2 may be omitted. Alternatively, in some other embodiments, the meandering parasitic resonators 28 may be omitted. In other words, the L-shaped parasitic resonators 27 and the meandering parasitic resonators 28 may not coexist in the magneto-electric dipole antenna array. For example, FIG. 11 illustrates a modification of this embodiment, where the magneto-electric dipole antenna array includes the meandering parasitic resonators 28, and does not include the L-shaped parasitic resonators 27 (see FIG. 4).

It should be noted that, in other embodiments, the magneto-electric dipole antenna array may include only one antenna unit 2.

Referring back to FIGS. 2 to 5, in view of the above, in this embodiment, by virtue of the magneto-electric dipole antenna array including the antenna units 2 that are disposed on the substrate 1 and that are arranged in an antenna unit array, and by virtue of each of the antenna units 2 including the electro-dipole component 21, the magnetic-dipole component 22, the first feeding probe 231, the second feeding probe 241, and the stripline 25 that is disposed between the first feeding probe 231 and the second feeding probe 241 for capacitive coupling, the magneto-electric dipole antenna array can have enhanced impedance bandwidth, enhanced impedance matching and enhanced antenna isolation. Moreover, by virtue of each of the antenna units 2 including the L-shaped parasitic resonators 27 that are disposed to enclose the stripline 25, and by virtue of the magneto-electric dipole antenna array including the meandering parasitic resonators 28 that are disposed among the antenna units 2, the mutual coupling effect among the antenna units 2 can be suppressed, and the gain of the magneto-electric dipole antenna array can be enhanced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A magneto-electric dipole antenna array comprising:

a substrate having an upper surface and a lower surface that are opposite to each other; and at least one antenna unit each including an electric-dipole component disposed on said upper surface of said substrate, a magnetic-dipole component disposed in said substrate between said upper surface and said lower surface of said substrate, and electrically connected to said electric-dipole component, a first feeding probe disposed on said upper surface of said substrate for vertical polarization, a second feeding probe disposed in said substrate and between said upper surface and said lower surface of said substrate for horizontal polarization, and a stripline disposed in said substrate and between said first feeding probe and said second feeding probe for capacitive coupling.

2. The magneto-electric dipole antenna array as claimed in claim 1, wherein each of said at least one antenna unit further includes:

four L-shaped parasitic resonators disposed in said substrate and between said upper surface and said lower surface of said substrate, coplanar with said stripline, and enclosing said stripline.

3. The magneto-electric dipole antenna array as claimed in claim 1, wherein, with respect to each of said at least one antenna unit:

said electric-dipole component includes four conductive rectangular patches that are divided into a first patch pair and a second patch pair;

said conductive rectangular patches of said first patch pair are aligned in a first direction that is parallel to said upper surface of said substrate, and are spaced apart from each other;

said conductive rectangular patches of said second patch pair are aligned in the first direction, and are spaced apart from each other;

said first patch pair and said second patch pair are spaced apart from each other in a second direction that is parallel to said upper surface of said substrate and that is perpendicular to the first direction; and said first feeding probe is disposed between said first patch pair and said second patch pair.

4. The magneto-electric dipole antenna array as claimed in claim 3, wherein, with respect to each of said at least one antenna unit, said magnetic-dipole component includes four conductive vias that respectively correspond to said conductive rectangular patches, that are perpendicular to said conductive rectangular patches, and that extend away from said upper surface of said substrate.

5. The magneto-electric dipole antenna array as claimed in claim 4, wherein:

each of said at least one antenna unit further includes a ground layer that is disposed in said substrate and between said upper surface and said lower surface of said substrate; and with respect to each of said at least one antenna unit, each of said conductive vias is electrically connected between said conductive rectangular patch corresponding to said conductive via and said ground layer.

6. The magneto-electric dipole antenna array as claimed in claim 5, wherein, with respect to each of said at least one antenna unit, said second feeding probe is disposed between said upper surface of said substrate and said ground layer.

7. The magneto-electric dipole antenna array as claimed in claim 4, wherein, with respect to each of said at least one antenna unit:

each of said conductive vias is disposed at a corner of said conductive rectangular patch corresponding to said conductive via, where the corner of said conductive rectangular patch corresponding to said conductive via is close to a geometric center of said conductive rectangular patches.

8. The magneto-electric dipole antenna array as claimed in claim 3, wherein, with respect to each of said at least one antenna unit, a geometric center of said first feeding probe, a geometric center of said stripline, a geometric center of said second feeding probe and a geometric center of said conductive rectangular patches are aligned in a hypothetical line that is perpendicular to said upper surface of said substrate.

9. The magneto-electric dipole antenna array as claimed in claim 8, wherein, with respect to each of said at least one antenna unit:

a projection of said stripline on said upper surface of said substrate is perpendicular to said first feeding probe;

a projection of said second feeding probe on said upper surface of said substrate is perpendicular to said first feeding probe; and the projection of said stripline on said upper surface of said substrate and the projection of said second feeding probe on said upper surface of said substrate overlap each other.

10. The magneto-electric dipole antenna array as claimed in claim 1, wherein each of said at least one antenna unit further includes:

a first feed-in line disposed on said lower surface of said substrate;

a second feed-in line disposed on said lower surface of said substrate;

a first conductive interconnect electrically connected to said first feeding probe and said first feed-in line; and a second conductive interconnect electrically connected to said second feeding probe and said second feed-in line.

11. The magneto-electric dipole antenna array as claimed in claim 10, wherein, with respect to each of said at least one antenna unit, each of said first feed-in line and said second feed-in line is a microstrip line.

12. The magneto-electric dipole antenna array as claimed in claim 1, wherein said at least one antenna unit includes a plurality of antenna units that are arranged in an antenna unit array.

13. The magneto-electric dipole antenna array as claimed in claim 12, wherein each of said plurality of antenna units further includes:

four L-shaped parasitic resonators disposed in said substrate and between said upper surface and said lower surface of said substrate, coplanar with said stripline, and enclosing said stripline.

14. The magneto-electric dipole antenna array as claimed in claim 12, further comprising:

a plurality of meandering parasitic resonators disposed on said upper surface of said substrate;

wherein, with respect to any two adjacent ones of said plurality of antenna units, one of said plurality of meandering parasitic resonators is disposed between the two adjacent antenna units.

15. The magneto-electric dipole antenna array as claimed in claim 12, configured to operate in a frequency range around and covering a target frequency, wherein a distance between two geometric centers of any two adjacent ones of said plurality of antenna units is substantially equal to half of a wavelength of the target frequency.

* * * * *